Dec. 8, 1936.  A. PERSON  2,063,335

VEHICLE HARDWARE FERRULE

Filed Dec. 24, 1934

INVENTOR
Alfred Person.
BY
Harness, Dickey, Pierce & Hann.
ATTORNEYS.

Patented Dec. 8, 1936

2,063,335

UNITED STATES PATENT OFFICE 2,063,335

VEHICLE HARDWARE FERRULE

Alfred Person, Detroit, Mich., assignor to The Murray Corporation of America, a corporation of Delaware Application December 24, 1934, Serial No. 758,999

4 Claims. (Cl. 296—139)

My invention relates to ferrules, and particularly to a ferrule for filling an uneven space between a flat and arcuate surface to provide a finish at the junction of an element and its support.

In the vehicle body art, it is the custom to mount hardware on various parts of the body, such as on doors, pillars, cowl, headers and other portions thereof. No difficulty was experienced heretofore when mounting such hardware because of the square shape of the body and the flat surface of its panels. Since the advent of stream line bodies, curved surfaces materially interfere with the mounting of the hardware. Where heretofore, flat surfaces mated directly with each other, now the flat surface of the hardware is spaced from the arcuate surface of the panel and materially detracts from the appearance of the body.

In practicing my present invention, I provide a ferrule to be disposed between the flat surface of the hardware and the curved surface of the panel to fill the space at all points therebetween, irrespective of the variations in depth of such spacing. The ferrule is preferably constructed of soft material of annular inwardly presenting channel shape and may be provided on its outer surface with a desired finish. The ferrule is placed between the flat surface of the hardware and the curved surface of the panel to be deformed into the shape of the space therebetween when the hardware is firmly positioned relative to the panel. By having the ferrule made of soft material it may readily be formed to the desired shape without deforming the curved contour of the panel against which it is secured.

Accordingly, the main objects of my invention are: to provide a ferrule for filling a space between a flat and arcuate surface to effect a finish thereto; to mount a deformable annular member beneath the shoulder of a cylinder element which is to be mated with an arcuate surface to have the member deform into the shape of the space between the surface and shoulder when the element is secured relative thereto; to provide a ferrule of annular inwardly presenting channel shape which will deform under pressure into the shape of a space it is to occupy; to provide a notch in the ferrule for receiving a projection on an associated element to retain the ferrule positioned against rotation; and, in general, to provide a ferrule for the hardware of an automobile body, which is simple in construction, which readily deforms without material expansion and which is economical in manufacture.

Other objects and features of novelty of my invention will be specifically pointed out, or will become apparent when referring, for a better understanding of my invention, to the following description, taken in conjunction with the accompanying drawing, wherein.

Figure 1:
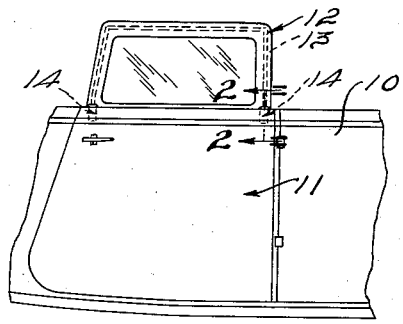
Figure 1 is a broken plan view of a vehicle door having a weather curtain secured in sockets provided with a ferrule embodying features of my invention.

In Fig. 1, I have illustrated a portion of a vehicle body 10 of the roadster or phaeton type, having a door 11 hinged thereon. The door is provided with a removable weather curtain 12 having a frame 13 disposed about the edge of the curtain to retain its shape. The ends of the frame extend below the curtain to form projections which are received by a socket 14 for retaining the curtain in removable fixed relation to the door.

Figure 3:
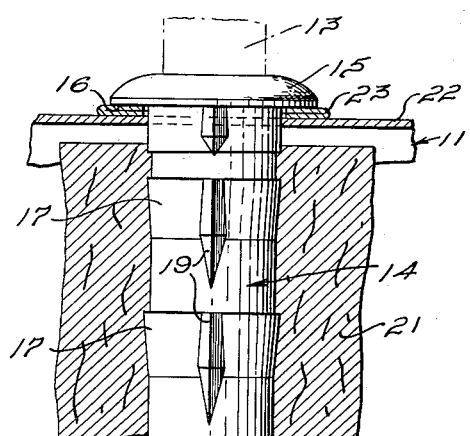
Fig. 3 is a sectional view of the structure illustrated in Fig. 2, taken on the line 3—3 thereof.
Figure 2:
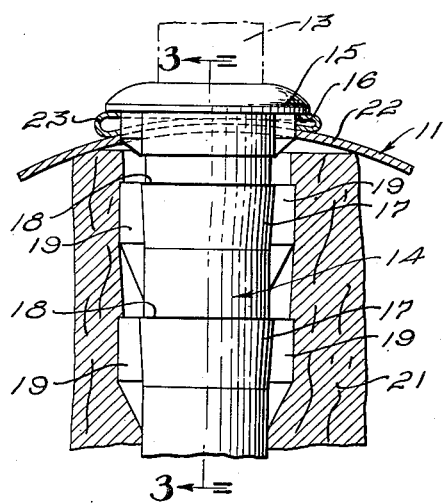
Fig. 2 is an enlarged sectional view of the structure illustrated in Fig. 1, taken on the line 2—2 thereof.
Figure 5:
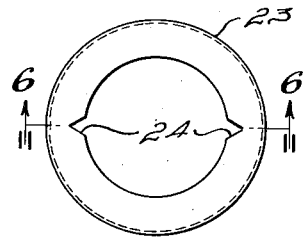
Fig. 5 is a plan view of the ferrule illustrated in Figs. 2, 3 and 4.
Figure 6:
Fig. 6 is a sectional view of the structure illustrated in Fig. 5, taken on the line 6—6 thereof.
Figure 4:
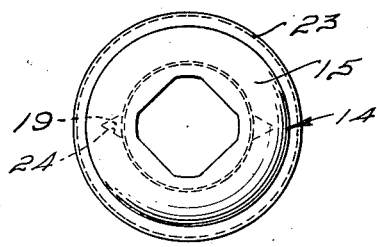
Fig. 4 is a plan view of the structure illustrated in Fig. 2.

An enlarged sectional view of the door 11 and the socket 14 is illustrated in Figs. 2 and 3. The socket is cylindrical in shape, having an aperture therein which is preferably square and is provided with a head 15 which forms a shoulder 16 on one end of the socket. The socket is preferably a casting having tapered portions 17 on the outer surfaces to form anchoring shoulders 18. Projections 19 are also provided on the socket which, when the socket is driven in a wood frame element 21 of the door, form anchor members to retain the socket fixed to the frame element 21. When a similar type of socket was employed heretofore, no difficulty was experienced in obtaining a finished joint between the shoulder 16 of the socket and the top panel of the door which was substantially flat.

In view of the trend of automobile bodies to curved surfaces, the top portion of the panel 22 of the door 11 is curved across the top edge, laterally of the door, as illustrated in Fig. 2. This provides only a line contact between the shoulder 16 and the curved surface, as will be evidenced from viewing Fig. 3. The portions of the shoulder 16 disposed at either side of the center line of the panel 22 is spaced from the panel and thereby provides an unfinished appearance. When attempting to construct a filling element for this variable space, difficulty was experienced in obtaining an element which flattened upon itself at the center line of the door, as viewed in Fig. 3, while retaining its thickness at the peripheral portion of the shoulder and substantially maintain the diameter of the element to be concentric with the periphery of the head 15.

This I have accomplished by constructing an element or ferrule of annular inwardly presenting channel shape of soft material. The ferrule may be provided with notches 24 on its inner peripheral edges, which receive the projections 19 of the socket. The notch is available to engage the topmost projection 19, when provided thereon, to prevent the rotation of the ferrule, which might occur and cause other portions of the ferrule to flatten and become loose on the socket. The ferrule, being of soft material, will readily flow inward without increasing its outer diameter to have its outer peripheral edge substantially concentric with the peripheral edge of the head.

By the use of the soft material, the panel 22 is not deformed when the socket is driven home, since the soft metal in the ferrule will provide a cushion as it is being deformed. A finish is preferably employed which will withstand the bending to which the ferrule is subjected, so as not to be damaged when the socket is driven home. The driving of the socket into the cross brace 21 firmly secures the socket in place and shapes the ferrule to fill the space between the panel 22 and the under surface of the shoulder 16. While the shoulder 16 is herein referred to as being flat, it is to be understood that it may be of any shape so long as it does not mate exactly with the panel 22 against which it is secured.

While I have described and illustrated but a single embodiment of my invention, it will be apparent to those skilled in the art that various changes, omissions, additions and substitutions may be made therein without departing from the spirit and scope of my invention, as set forth in the accompanying claims.

I claim as my invention:

1. The combination with a door of a vehicle having an arcuate surface at the top edge, of a socket disposable in said door having a shoulder extending over the arcuate surface and unmateable therewith, and a ferrule of annular inwardly presenting channel shape disposed between the shoulder of said socket and the arcuate surface at the top edge.

2. The combination with a door of a vehicle having an arcuate surface at the top edge, of a socket disposable in said door having a shoulder extending over the arcuate surface and unmateable therewith, and a ferrule of annular inwardly presenting channel shape disposable between the shoulder of said socket and the panel of said door, said ferrule being made of deformable material so as to readily assume the shape of the variable space between the arcuate surface of the top edge and the adjacent surface of the shoulder.

3. The combination with a door of a vehicle having an arcuate surface at the top edge, of a socket disposable in said door having a shoulder extending over the arcuate surface and unmateable therewith, and a ferrule of annular inwardly presenting channel shape disposable between the shoulder of said socket and the said arcuate surface, said ferrule having at least one notch, and at least one projection on said socket which is mateable with said notch of said ferrule.

4. The combination with a shouldered socket, the shoulder of said socket having a substantially plane surface and a door panel having a substantially arcuate surface, of a deformable ferrule between said surfaces, said ferrule prior to deformation having an inwardly presenting channel section, the walls of said channel lying in planes vertical to the axis of said socket.

ALFRED PERSON.